United States Patent [19]

Weiss

[11] Patent Number: 4,769,610

[45] Date of Patent: Sep. 6, 1988

[54] TONE DECODER

[75] Inventor: Karl R. Weiss, Sunrise, Fla.

[73] Assignee: Motorola, Inc., Schaumburg, Ill.

[21] Appl. No.: 67,750

[22] Filed: Jun. 29, 1987

[51] Int. Cl.$^4$ .......................... H03K 9/06; G06F 7/38
[52] U.S. Cl. ..................................... 328/138; 328/133;
328/140; 307/520; 307/522; 364/724.09;
364/728.03
[58] Field of Search .................. 328/133, 138, 140;
307/522, 479, 520; 364/724, 728

[56] References Cited

U.S. PATENT DOCUMENTS

| | | | |
|---|---|---|---|
| 3,806,938 | 4/1974 | Zegarski et al. | 340/167 R |
| 3,937,899 | 2/1976 | Denenberg | 328/138 |
| 3,993,956 | 11/1976 | Gilmore et al. | 364/724 |
| 4,216,463 | 5/1980 | Backof, Jr. et al. | 340/171 R |
| 4,302,817 | 11/1981 | Labedz | 364/724 |
| 4,513,385 | 4/1985 | Muri | 364/572 |
| 4,660,164 | 4/1987 | Leibowitz | 364/728 |

Primary Examiner—Stanley D. Miller
Assistant Examiner—Trong Quang Phan
Attorney, Agent, or Firm—Daniel K. Nichols; Joseph T. Downey

[57] ABSTRACT

This tone decoder utilizes three correlators for detecting the presence of a desired tone signal. A main correlator correlates to the desired tone frequency, while two side correlators are used to correlate to frequencies above and below the desired tone frequency. Tone detection is indicated by correlation of the main correlation and absence of correlation by the side correlators. Improved bandwidth and/or correlation time is achieved as compared to utilizing a single correlator.

5 Claims, 4 Drawing Sheets

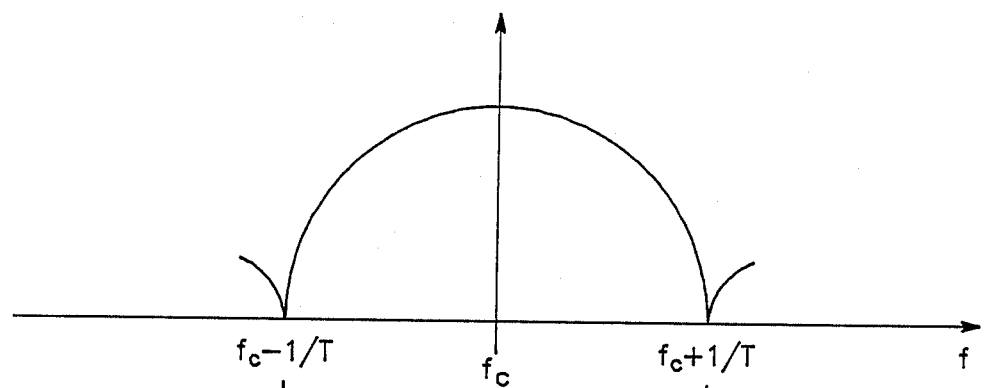
*FIG.3A*
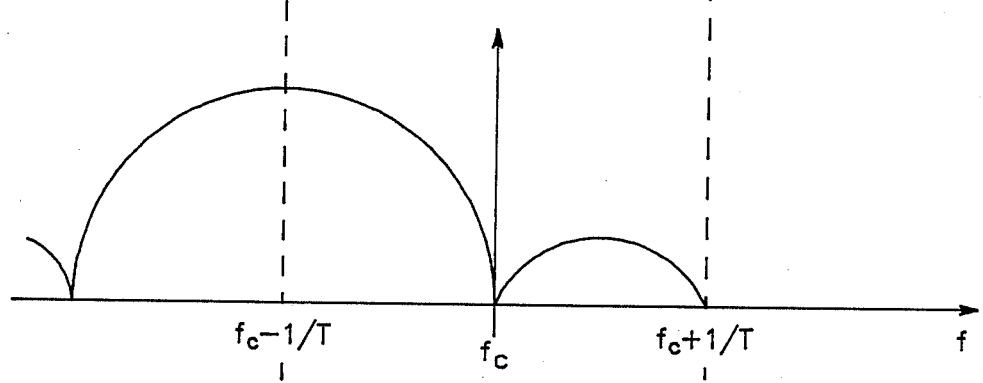
*FIG.3B*
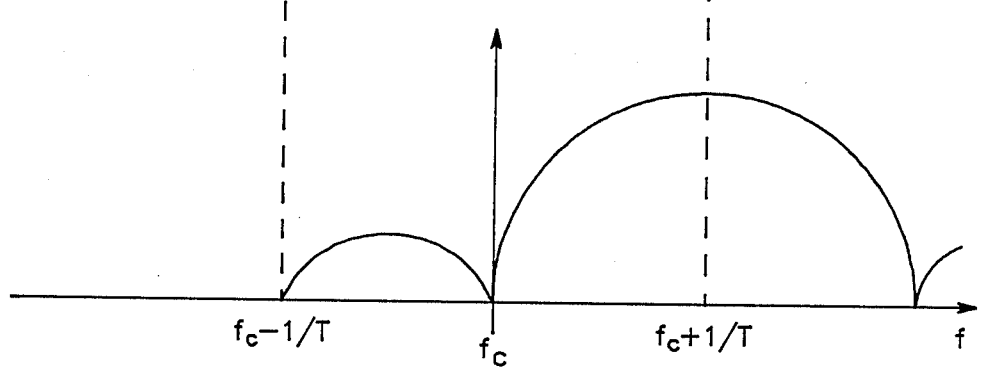
*FIG.3C*
*FIG.3*

TONE DECODER

BACKGROUND OF THE INVENTION

This invention relates to tone decoders in general and particularly to a tone decoder in which multiple correlators are utilized to confirm the presence of a desired tone. A digital tone decoder, such as illustrated in U.S. Pat. No. 4,216,463, is based on a digital quadrature correlation technique. The frequency response can approximately be described by the equation $$H(f) = \frac{\sin \pi T(f_c - f_i)}{\pi T(f_c - f_i)} = \text{sinc } A$$

where;
T is the observation time in seconds
$f_c$ is the center frequency in Hertz
$f_i$ is the incoming frequency in Hertz.
$A = \pi T (f_c - f_i)$.

The bandwidth of the correlator is defined as the range of frequencies that will cause the correlation value to be above a detect threshold. It will readily be appreciated that the bandwidth is inversely related to the observation time. Consequently, with such an approach if a relatively narrow bandwidth is required, the observation time must be relatively large, and any decrease in the observation time will result in a wider bandwidth.

It is often desirable to provide some detector that include both relatively narrow bandwidth and a relatively short observation time in order to provide for fast detecting of a tone which may be close in frequency to other possible tones.

SUMMARY OF THE INVENTION

This tone detector utilizes three correlators, one centered on the desired tone frequency and the other two centered above and below the desired frequency, in order to give improved bandwidth and/or decreased observation time.

In one aspect of the invention, the tone detector includes a first tone detecting means for detecting a first tone frequency $f_c$, a second tone detecting means for detecting a second tone frequency less than the first tone frequency $f_c$, and a third tone detecting means for detecting a third tone frequency greater than the first tone frequency $f_c$. Logic means coupled to the first, second and third detector means operatively determines when only the first tone detecting has detected a tone thereby indicating detection and correlation of the desired tone.

In one aspect of the invention, the first, second and third tone detecting means are digital correlators. Each of the digital correlators, correlate samples over a time interval T. In still another aspect of the invention the second frequency is substantially equal to $f_c - 1/T$, and the third frequency is substantially equal to $f_c + 1/T$.

BRIEF DESCRIPTION OF THE DRAWINGS

FIG. 3A is a frequency response curve for the main correlator of FIG. 1

FIG. 3B is a frequency response curve for one side correlator of FIG. 1.

FIG. 3C is a frequency response curve for the other side correlator of FIG. 1.

DESCRIPTION OF THE PREFERRED EMBODIMENT.

Figure 1:
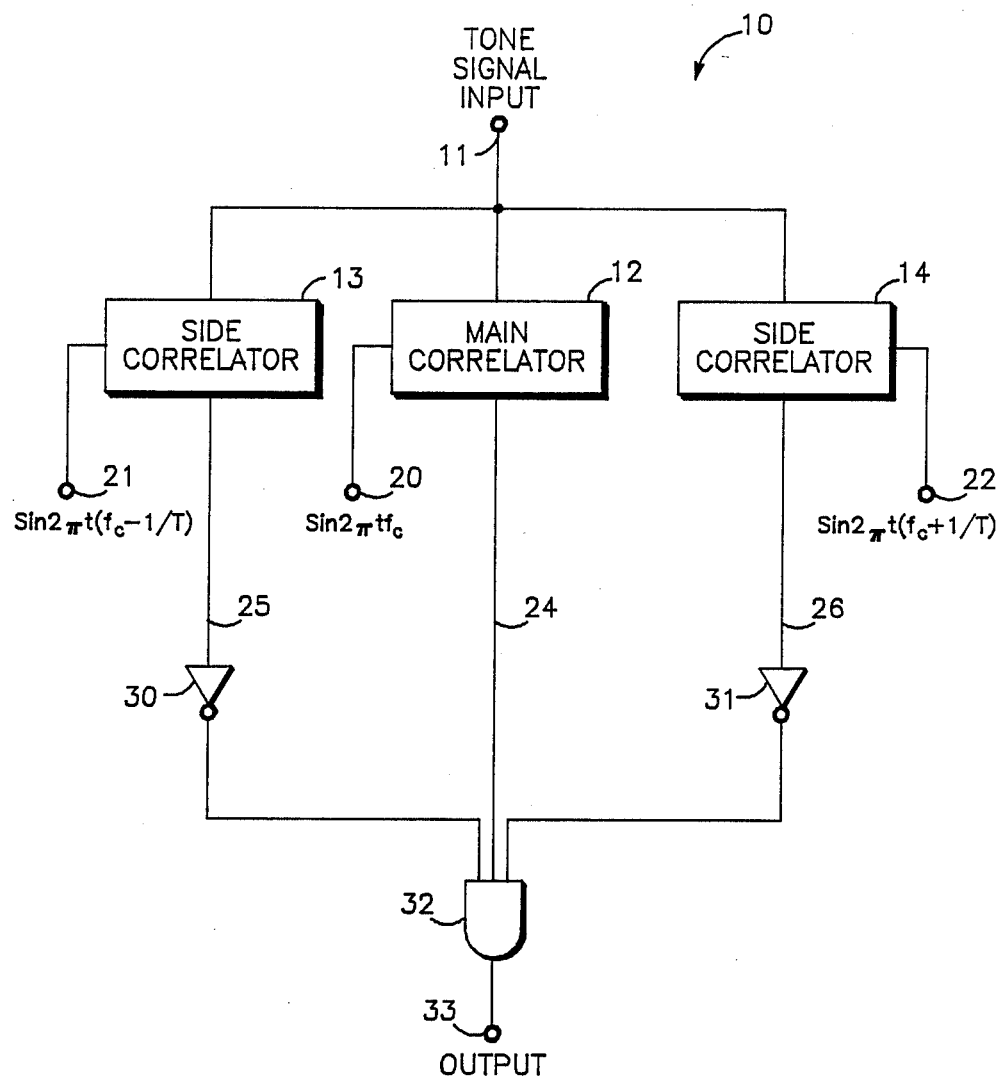
FIG. 1 is a block diagram of a tone detector utilizing the present invention.

Referring now by characters of reference to the drawings and first to FIG. 1, it will be understood that the tone decoder 10 includes a tone signal input 11 which supplies the tone signal to a main correlator 12 and side correlators 13 and 14. The main correlator 12 is designed to correlate to a center frequency $f_c$ as determined by a tone reference signal that is applied at its input 20. In the preferred embodiment, the supplied tone reference signal is equal to sin 2 $\pi$ t ($f_c$), where t is the time in seconds. Side correlator 13 is supplied at its input 21 with a frequency higher than $f_c$ for its tone reference signal, in this case the tone reference signal is equal to the sin 2 $\pi$ t ($f_c - 1/T$), where T is the observation time in seconds. An input 22 of side correlator 14 is supplied with a similar tone reference signal at a frequency greater than $f_c$, in this case the signal is equal to sin 2 $\pi$ t ($f_c + 1/T$). The correlators 12-13 include outputs 24-26 respectively. Each of the correlators 12-14 will supply a binary "high" output when the correlation level is higher than a predetermined value set for the correlator and will supply a binary "low" output when the correlation value is less than that set for the correlator.

The outputs of correlators 25 and 26 are inverted by inverters 30 and 31 respectively. An AND function is performed on the outputs of the inverters 30 and 31 and the output 24 of correlator 12 as by AND gate 32. Output 33 of AND gate 32 supplies the output signal for the tone decoder 10 which, in the preferred embodiment, is high when the tone signal $f_c$ has been correlated.

Figure 2:
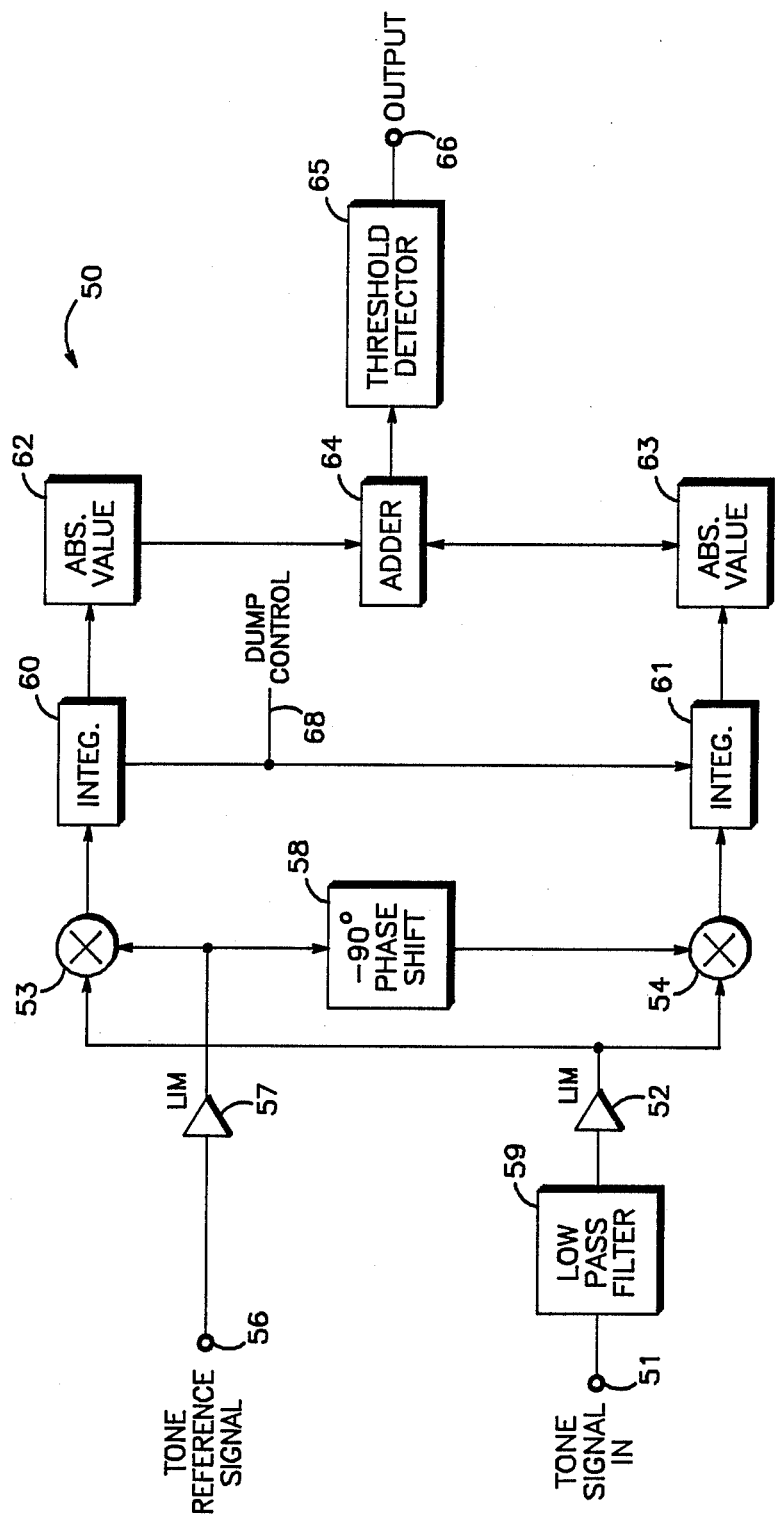
FIG. 2 is a block diagram of a correlator of FIG. 1.

Referring now to FIG. 2, a digital correlator 50 is illustrated of the type used for each of the correlators 12, 13 and 14. The tone signal is supplied to input 51 of digital correlator 50, and is passed through a limiter 52 before being applied to a pair of mixers or multipliers 53 and 54.

The tone reference signal, which determines the correlator center frequency, is supplied at input 56 to limiter 57 and is applied directly to mixer 53 and through a 90 degree phase shift circuit 58 for application to mixer 54. Outputs of mixers 53 and 54 go to integrators 60 and 61 respectively, which have their outputs connected to an absolute value circuits 62 and 63, respectively. The outputs of the absolute value circuits 62 and 63 are applied to an adder 64, which has its outputs applied to a threshold detector 65. Its output 66 provides the output for the digital correlator 50. The integrators 60 and 61 also connected to a dump control 68 that controls the integration interval.

In the preferred embodiment, the digital correlator 50 is implemented in a microprocessor. The function of all three digital correlators can be implemented in this single microprocessor. Alternatively, discrete correlators or even anolog correlators can be utilized.

The operation of this digital correlator is described in U.S. Pat. No. 4,216,463 issued to Backof, Jr. et al., the disclosure of which is incorporated herein by reference, and its also described in U.S. Pat. No. 4,513,385 issued to Muri, the disclosure of which is incorporated herein by reference.

Referring now to FIG. 3, the responses of the correlators 12, 13, and 14 are illustrated. The center of the passband of the main correlator 12 is at frequency $f_c$ as shown in FIG. 3A. The response falls to a null points at frequencies equal to $f_c$ plus or minus 1/T and at each 1/T increment.

In the preferred embodiment, the center of the passband of side correlator 13 is chosen as $f_c - 1/T$ thereby by providing a null at frequency $f_c$, as well as frequency $f_c + 1/T$, as is shown in FIG. 3B. Similarly, the passband of side correlator 14 is centered at frequency $f_c + 1/T$ and has nulls at frequencies $f_c$ and $f_c - 1/T$ as in FIG. 3C.

Figure 4:
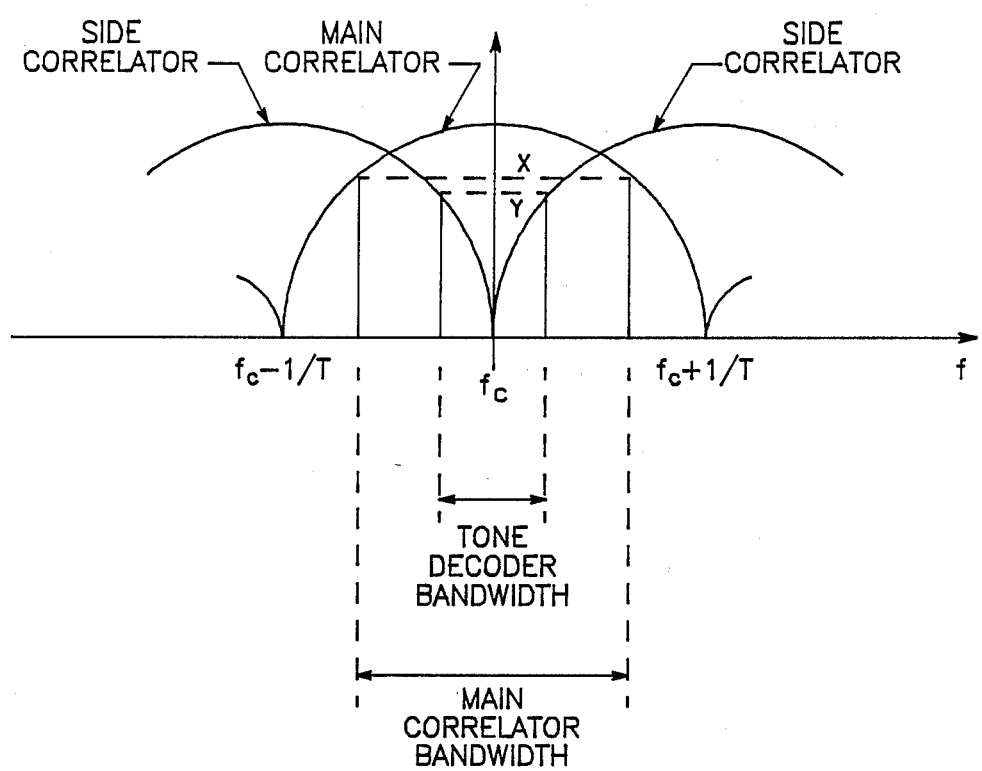
FIG. 4 is a combined frequency response curve for the tone detector of FIG. 1.

Referring now to FIG. 4, the combined frequency response of the tone decoder 10 is illustrated. For a threshold level X for the threshold detector 65 of main correlator 12, a relatively wide bandwidth is illustrated which will correspond to the bandwidth of the decoder without the sides correlators 13 and 14. The addition of the side correlators 13 and 14 with their threshold levels set at Y results in a relatively narrow bandwidth illustrated in the drawing. It will be understood that this illustrated bandwidth improvement is accomplishing without changing the time interval T during which correlation occurs. If desired, a shorter time interval T could be utilized resulting in faster correlation with a wider bandwidth, assuming that the same Y level is maintained as the threshold level for side correlators 13 and 14.

As an example, if tone decoder 10 is to be used to decode subaudible tones used for coded squelch operation of a radio, it must be capable of distinguishing the desired tone frequency from closely spaced valid tone frequencies. If the desired tone frequency is 100 Hz, the two closest valid subaudible tone frequencies are 97.4 Hz and 103.5 Hz. With a sample time interval T of 109.2 ms, 1/T equals 9.16. The center frequency of side correlator 13 would be 90.89 Hz while the center frequency of side correlator 14 would be 109.16 Hz. Use of these exact frequencies will put nulls directly at 100 Hz. This is, however, not critical and the center frequency for correlator 13 could be substantially in the range from 90.84 − 1/T(0.05) to 90.84 + 1/T(0.01), while the center frequency for correlator 14 could be substantially in the range from 109.16 − 1/T(0.01) to 109.16 + 1/T(0.05).

The X correlation value can be selected to provide intercept points which may be at −2.5 db and would provide approximately a 7.4 Hz bandwidth for main correlator 12. For a sample rate that provides 117 samples during the 109.2 ms time interval the correlation value X of main correlator 12 would be 88/117.

The Y correlation value can be selected to provide intercept points which may be at −15.3 db and would result in a decoder bandwidth of approximately 2.4 Hz. The correlaion value Y used by side correlators 13 and 14 would equal 20/117.

This example illustrates that for a sample time interval of 109.2 ms the decoder 10 by utilizing the three correlators 12-14 has a bandwidth of 2.4 Hz as compared with the bandwidth of 7.4 Hz provided by the single correlator 12.

It is believed that the operating characteristics and functional advantages of the tone detector has become fully apparent from the foregoing description of parts, but for completeness of disclosure, a brief description of the operation of the tone detector will be given.

In operation, the tone detector 10 correlates on the desired tone frequency, as well as tone frequencies on either side of the desired tone frequencies. The main correlator 12 is relied on solely to indicate the possible presence of the desired tone frequency $f_c$, and not to exclude the possibility of the presence of tone frequencies to either side of $f_c$. The side correlators 13 and 14 are utilized to confirm the absence of tone frequencies on either side of $f_c$. Only when the main correlator 12 correlates to a tone, and both the side correlators 13 and 14 do not correlate to the tone is a valid tone detect indicated.

A lower correlation value for side correlators 13 and 14 than the correlation value used for the main correlator 12 is selected in order to provide further bandwidth reduction for the tone decoder 10.

I claim as my invention:

1. A tone detector comprising:
   first tone detecting means for detecting a first tone frequency $f_c$,
   second tone detecting means for detecting a second tone frequency less than first tone frequency $f_c$,
   third tone detecting means for detecting a third tone frequency greater than first tone frequency $f_c$,
   logic means coupled to the first, second, and third tone detector means for determining when only the first tone detecting means has detected a tone frequency.

2. A tone detector as defined in claim 1, in which:
   the first, second, and third tone detecting means comprise digital correlators.

3. A tone detector as defined in claim 2, in which:
   each of the digital correlators correlate samples over a time interval T.

4. A tone detector as defined in claim 3, in which:
   the second tone frequency is substantially equal to $f_c - 1/T$, and
   the third tone frequency is substantially equal to $f_c + 1/T$.

5. A tone decoder for detecting the presence of a tone frequency comprising:
   a main correlator for correlating to a range of frequencies including $f_c$,
   a first side correlator for correlating to a range of frequencies less than $f_c$,
   a second side correlator for correlating to a range of frequencies greater than $f_c$, and
   logic means operatively connected to the main and two side correlators and responsive to correlation by the main correlator and the absence of correlation by the two side correlators for indicating detection of the presence of the tone frequency $f_c$.

* * * * *